United States Patent [19]

Rhee

[11] Patent Number: 4,594,808
[45] Date of Patent: Jun. 17, 1986

[54] METHOD OF CATCHING FLIES
[76] Inventor: Yong S. Rhee, 251-1 Soo Yoo 2nd Dong, Dohbong-ku, Seoul, Rep. of Korea
[21] Appl. No.: 780,913
[22] Filed: Sep. 27, 1985
[51] Int. Cl.⁴ ............................................... A01M 3/02
[52] U.S. Cl. ................................................. 43/134
[58] Field of Search ................ 43/134, 135, 137, 139; 224/920, 921, 922; 206/315.11

[56] References Cited

U.S. PATENT DOCUMENTS

| | | | |
|---|---|---|---|
| 115,374 | 5/1871 | Sohier | 43/134 |
| 132,733 | 11/1872 | Olson | 43/134 |
| 4,530,178 | 7/1985 | Rauscher | 43/54.1 |

Primary Examiner—Nicholas P. Godici
Assistant Examiner—M. Jordan
Attorney, Agent, or Firm—Fisher, Christen & Sabol

[57] ABSTRACT

A light-weight, transparent, elongated enclosure generally in the shape of a trapezoidal member, has an opening at a bottom end and at a top end, the transparent material being resiliently deformable. Two generally planar sheets of material are used, and are in overlying relationship, and are fastened together along opposed edges thereof. Squeezing together of the longest sides of the trapezoidal member by manual operation results in deformation of the two overlying sheets away from each other. This results in a continuous opening from a large side of the trapezoid at the bottom through to a top, short, side of the trapezoid at the top.

In operation, the fly catcher is squeezed manually to provide an opening as described above, and is then positioned above the fly to be caught. The fly, sensing the pressure due to movement of the sending fly catcher flies upwardly and into the cone-shaped opening formed by the fly catcher. Pressure is then immediately released, and the sheets returned to their normal, generally planar state thus trapping the fly between the two sheets of transparent material. The fly can be exterminated by pressure if necessary. The remains of the fly are removed merely by repeating the manual squeezing operation on the sides of the fly catcher, permitting the remains to fall out of the enclosure.

6 Claims, 9 Drawing Figures

U.S. Patent   Jun. 17, 1986   Sheet 1 of 2   4,594,808
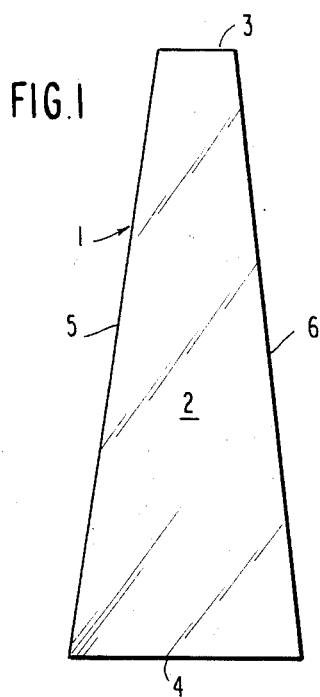
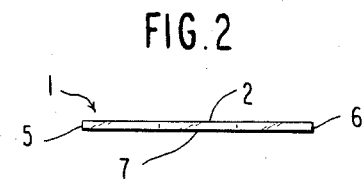
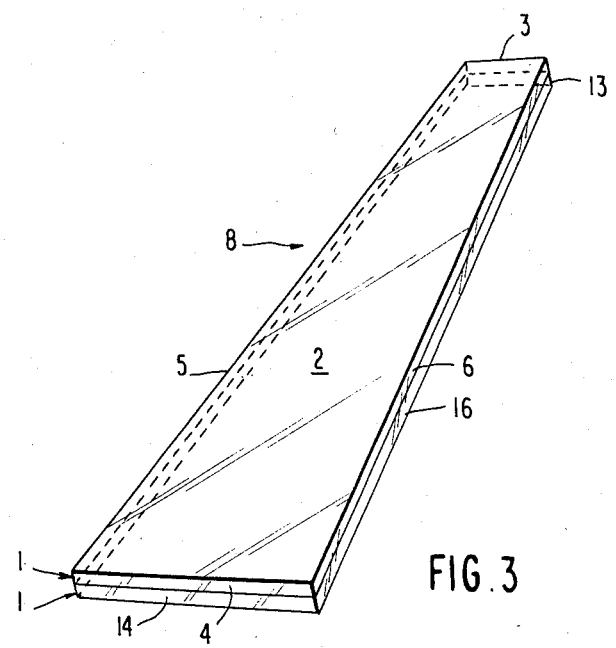
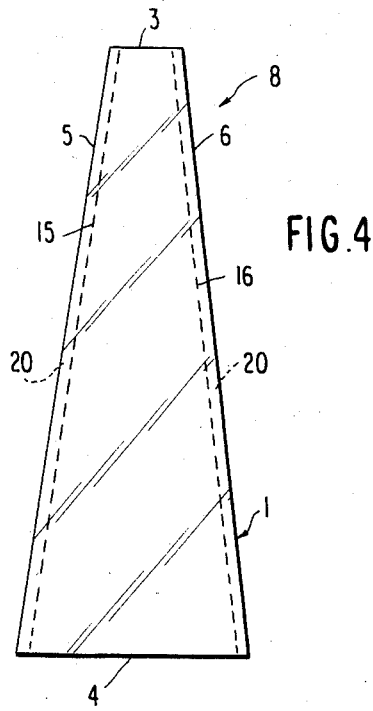
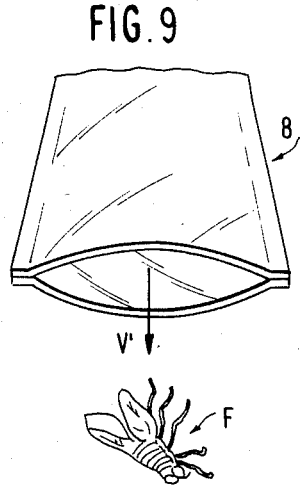

METHOD OF CATCHING FLIES

BACKGROUND OF THE INVENTION

This invention relates to a device for catching flies or other flying insects without use of chemical sprays, fly swatters, or fly traps. In particular, this invention relates to a manually operable no hit fly catcher which is economical to make and which is effective in use for trapping and disposing of flies.

It is well-known to use fly swatters to exterminate insects. In particular, a fly swatter includes a screen-like material to permit passage of air, which is necessary since household flies and other insects are highly sensitive to air pressure variations and could easily escape before being swatted. Thus, due to the reduction of air pressure provided by the holes in a screen-like material of a fly swatter the fly has insufficient time to escape to avoid being swatted. However, the "swatting" process is highly unsanitary, and spread the remains of the insect across the solid surface on which the fly had been resting. In the case where the fly is resting upon utensils used for handling food, or upon kitchen or table surfaces where food is handled, the use of a fly swatter is unsanitary and should be avoided, since insects can carry in their blood and body parts infectous and contagous diseases.

Chemical sprays are useful in killing flying insects, and are generally most effective when sprayed directly upon the insect. However, where the insects are in a kitchen, a table for food, or on food itself, the use of sprays is inadvisable since chemical sprays are usually poisonous to human beings as well as to insects. Such chemical sprays are commonly found as aerosol sprays, and cannot be readily used where a fly or flying insect is resting upon a surface such as food, tableware, kitchen utensils, or the like, which should not be sprayed with a poisonous substance such as insect spray.

Also well-known in the art are fly traps including devices such as sticky fly paper having a fly-attracting scent. Other types of fly-trapping devices include an ultraviolet light source surrounded by electrified wires to shock and/or incenerate insects approaching the ultraviolet light source. While this is generally sanitary, it is not selectively effective upon a particular fly. In such a situation, a particular fly may not be attracted to the sticky fly paper or the ultraviolet light source. Furthermore, fly paper is not reusable. Also, use of the ultraviolet light source and electrified wires is generally much more expensive and is cumbersome, and is generally not readily portable since requiring an electrical power source.

SUMMARY OF THE INVENTION

It is accordingly one object of the present invention to provide an improved fly catcher which is inexpensive to fabricate, requires no complex equipment or expensive materials in the fabrication thereof, and can be manufactured by persons of common skills.

Another object of the invention is to provide a sanitary fly catcher for selectively catching an individual fly without swatting or destroying at the location where the fly is to be caught.

Another object of the present invention is to provide a manually operable improved fly catcher which is reusable, portable, and which is effective in trapping flies.

The improved fly catcher of the present invention comprises a light-weight, transparent, elongated enclosure generally in the shape of a trapezoidal member, having an opening at a bottom end and at a top end, the transparent material being resiliently deformable. Two generally planar sheets of material are used, and are in overlying relationship, and are fastened together along opposed edges thereof. The edges fastened together along their edges or edge portions are fastened along the longest sides of the trapezoidal member. Squeezing together of the longest sides of the trapezoidal member by manual operation results in deformation of the two overlying sheets away from each other along a central region between the portions which are fastened together. This results in a continuous opening from a large side of the trapezoid at the bottom through to a top, short, side of the trapezoid at the top.

In operation, the improved fly catcher of the present invention is squeezed manually to provide an opening as described above, and is then positioned above the fly to be caught. The fly, sensing the pressure due to movement of the sending fly catcher flies upwardly and into the cone-shaped opening formed by the fly catcher of the present invention. Pressure is then immediately released, and the sheets returned to their normal, generally planar, state, thus trapping the fly between the two sheets of transparent material. Since the resilient pressure retaining the fly between the two sheets is not very great, the fly will not be destroyed by the return of the resilient sheets to their original state, but rather the fly will be trapped between the sheets where it will struggle.

Where the material is transparent, as is the referred embodiment, the fly is less able to sense the presence of the fly catcher of the present invention until the fly is trapped. C(A) As most of insects can hardly sense the presense of the transparent sheet such as glass sheet (we often see a fly trying to escape against the window glass sheet very often) and do not fly away until the referred embodiment is positioned above them as long as pressure is made very little. Once trapped, a light pressure over the location of the fly, as by pinching or lightly wrapping the improved fly catcher against a hard surface, will result in the extermination of the fly. The remains of the fly are removed merely by repeating the manual squeezing operation of the sides of the improved fly catcher, so as to open the fly catcher into a cone-shaped member whereby the remains of the fly downwardly and out of the improved fly catcher. Thus, disposal of the remains of the fly is a sanitary process, whereby the remains of the fly can be disposed of at a location distant and removed from the location at which the fly was caught. This is particularly advantageous where the fly is resting or lying near food, food utensils, the kitchen, or a table for serving food, where the use of chemicals, swatting, or the like is to be avoided.

Further details and advantages of the present invention appear from the following description of the preferred embodiment shown schematically in the drawings.

BRIEF DESCRIPTION OF THE DRAWINGS

FIG. 1 shows a top elevational of a sheet used in the present invention as one side of the improved fly catcher device;

FIG. 2 is a bottom elevational view of the sheet of FIG. 1;

FIG. 3 is a perspective view showing two sheets superposed, each sheet being as shown in FIG. 1;

FIG. 4 is a top elevational view showing the regions of attachment of the two sheets along edges thereof;

FIG. 9 is a perspective view showing the removal of the remains of the fly from the improved fly catcher of the present invention.

DETAILED DESCRIPTION OF THE INVENTION

Figure 5:
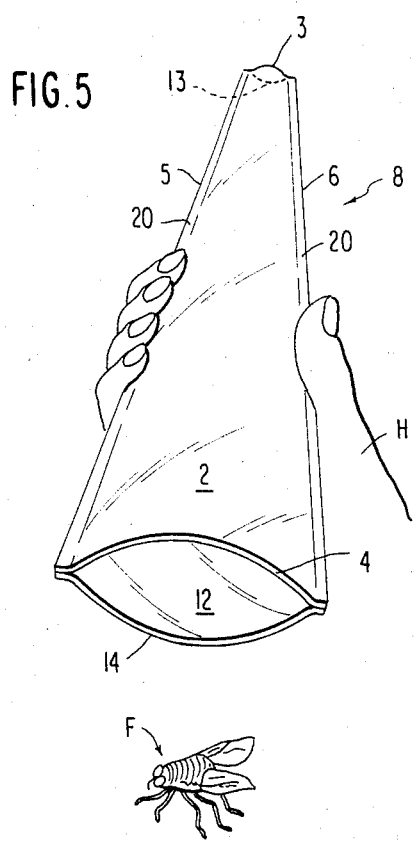
FIG. 5 is a perspective view of the improved fly catcher distorted manually to form a cone-shaped article and being positioned over an insect to be caught.

FIG. 1 is a front elevational view of a transparent sheet 1 used in the present invention. The sheet is generally trapezoidal in shape, having a top surface 2, and a bottom edge 4, the edges 3 and 4 being generally parallel to one another in the preferred embodiment. A left edge 5, and a right edge 6, complete the boundaries of the generally trapezoidal sheet 1.

The sheet 1 of the present invention is preferably formed of a transparent material such as a transparent plastic sheet. Preferably, a hard-type PVC sheet is used, however other resiliently deformable transparent sheets are also usable in the present invention. Furthermore, any material, whether transparent or not, which is resiliently deformable, can be used in the present invention. In particular, solid hard rubber sheets can be used, however this is not preferred since the transmission of light through the sheet is an advantage of the present invention and assists in the resulting efficiency of the invention.

The sheet 1 shown in FIG. 1 can be formed in any fashion, such as cutting from a larger sheet, or it may be molded in the final form. The sheet should preferably be sufficiently thick to be manually deformable without very great resistance, and must not be so thin that wrinkling of the sheet is permitted. Furthermore, the sheet 1 should be sufficiently thick to enable the sheet to return to its undeformed shape upon release of manual pressure. In the case of PVC plastic, such thickness may be in the range of 1/20 of an inch to ¼ inch, however the required thickness of the plastic sheet and the permissible range of thicknesses will vary greatly depending upon the particular material used. For particularly rigid plastic, a thickness of no more than 1/1000 may conceivably be used.

FIG. 2 is a bottom elevational view of the sheet of FIG. 1, showing its generally uniform thickness, and showing in dotted outline the top edge 3 (unnumbered in FIG. 2). Also shown in FIG. 2 is the bottom surface 7 and the top surface 2.

FIG. 3 shows an assembly 8 of two sheets 1, which are in directly overlying relationship. The upper-most sheet in FIG. 3 has a top edge 3, while the lower-most sheet in FIG. 3 has a top edge numbered 13. Also, the side edge in FIG. 3 of the bottom-most sheet on the right-hand side is numbered 16. The bottom-most edge of the lower-most sheet is numbered as side 14. The sheets 1 are of substantially identical material for ease of construction, however each sheet 1 can be formed of a different material, including a different color, thickness, or consistency without departing from the scope of the present invention.

In FIG. 3, the top of the lower-most sheet is shown in dotted outline, as is the furthermost corner of the upper-most sheet 1.

FIG. 4 is a top elevational view of the assembly 8 of FIG. 3. FIG. 4 shows in dotted outline a region 20 along the left and right hand side portions of the assembly 8. The innermost extent of the left-hand region 20 is indicated by the dashed line 15, while the inner-most extent of the right-hand portion of the region 20 is indicated by the dashed line 16. The region 20 may be formed by joining together the two sheets 1,1 in any desired manner, such as chemically bonding the sheets 1,1 where they are in contact with one another. This may be done by using, for example, a thermal adhesive, pressure sensitive adhesive, animal glue, or the like. Also, the bond may be formed by use of ultrasonic welding, heat welding, or the like, depending upon the properties of the material. Furthermore, the region 20 can alternatively be formed by the use of commonly available plastic adhesive tape having a pressure-adhesive-coated side. In this instance, the region 20 would indicate the region of adhesive tape applied to one side of the assembly 8, with the adhesive tape being folded along the edges 5 and 6 respectively so as to also overlie a bottommost sheet. In such an instance, it is preferable that the adhesive tape overlie both the top-most and the bottom-most sheets to an equal extent; however, this is not absolutely necessary. Furthermore, although the region 20 is shown as generally a continuous region, such need not be the case. Rather, the region adhere together may be discontinuously fastened as by dots, small patches of adhesive tape, small patches of adhesive glue or ultrasonic welding. Furthermore, patterns of attachment can be formed as well.

FIG. 5 shows the operation of the assembly 8 to catch a fly F. Assembly 8 is squeezed manually as shown in FIG. 5 by a hand H. This causes the assembly 8 to open and reveals the upper-most surface 12 of the lower-most sheet 1. In use, the assembly 8 is open and gradually or gently positioned over the fly F so as to avoid frightening the fly F away. The rounded, almost conical, shape of the assembly 8 is seen clearly in the perspective view of FIG. 5.

Figure 6:
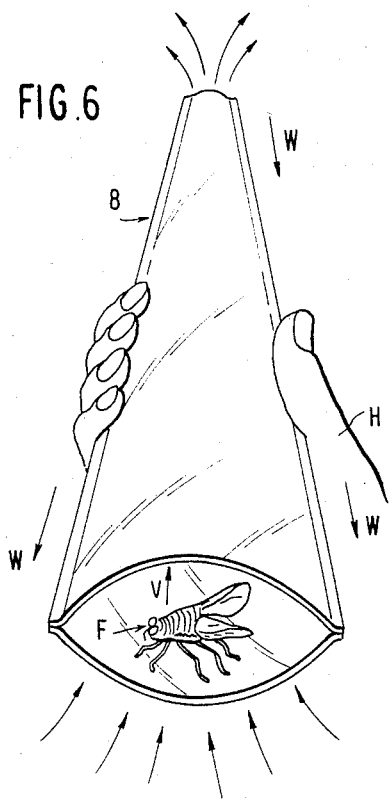
FIG. 6 is a view similar to FIG. 5, showing the downward motion of the improved fly catcher and the upward flying motion of the insect, as well as showing air flow through the coneshaped improved fly catcher.

In FIG. 6, a view similar to that shown in FIG. 5 is seen, with the cone being brought down with a velocity W and the fly F traveling upwardly with a velocity V. Also seen in FIG. 6 are arrows indicating airflow as the conical assembly 8 travels downwardly with a velocity W.

Figure 7:
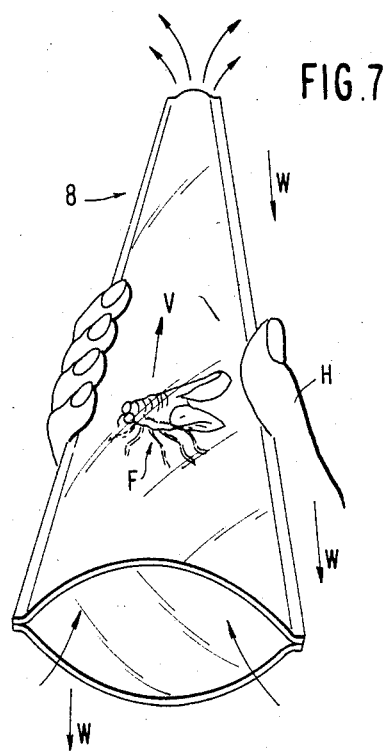
FIG. 7 is a view similar to FIG. 6, showing the fly at a location within the cone-shaped improved fly catcher.

FIG. 7 is a perspective view similar to FIG. 6, with the fly F having reached a region inside the conically-shaped assembly 8. At this point, the fly is continuing to travel upward with a velocity indicated as V, and the conical member is indicated as traveling downward with a velocity W. Arrows generally indicate the air flow into and out of the conically-shaped assembly 8. At this point the manual pressure indicated as being applied by the hand H is released, and the assembly 8 tends to immediately return to its undeformed, planar condition.

Figure 8:
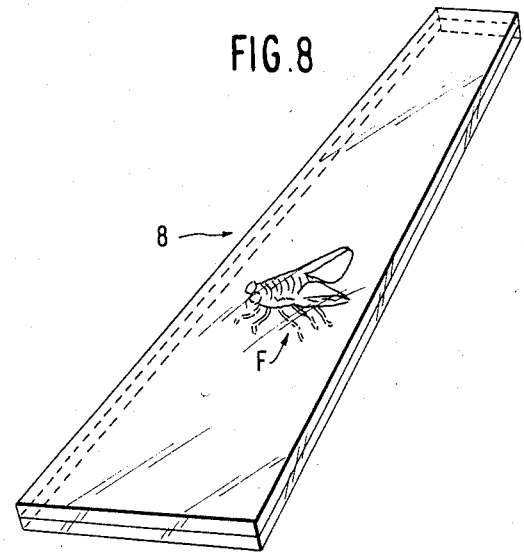
FIG. 8 is a perspective view similar to FIG. 3, showing the fly trapped within the improved fly catcher after release of manual pressure.

FIG. 8 is a perspective view of the assembly 8 similar to that shown in FIG. 3, but with a fly F trapped between the sheets 1,1 (unnumbered in FIG. 8). The fly remains undestroyed and still alive in FIG. 8, but is trapped between the two sheets.

The fly F is trapped in the assembly 8 by fricitional forces as the assembly 8 returns to its generally undeformed condition. The presence of the fly F does create a slight bulge in the assembly 8 as seen in FIG. 8. While the fly F may struggle, it would take a relatively long time for the fly to crawl out of the assembly 8 due to the frictional forces of the sheets 1,1 of the assembly 8, as well as due to electrostatic attraction of the fly to the sheets. Such electrostatic attraction also would tend to attract the opposed sheets 1,1 toward one another to increase the force which the fly must overcome in order to crawl out of the assembly 8.

While the fly is trapped as in FIG. 8, it may be exterminated by pinching the opposed sides of the assembly 8 where the fly F is located. This pinching could be a gentle pressure applied as by opposed fingers, or the fly can be exterminated as by slapping the assembly 8 against a hard surface. Alternatively, the fly F can be exterminated merely by squeezing the opposed edges manually to form the conically-shaped configuration as seen in FIGS. 5-7 to merely release the fly where desired, for example the fly may be trapped indoors and released outdoors. Also, the improved fly catcher of the present invention can be used to collect specimens for study in the outdoor enviroment, and brought indoors where they can be deposited into receptacles for study.

FIG. 9 is a perspective view showing the removal of the remains of the fly F where the fly has been exterminated in the assembly as by pinching or the like. Here, the remains of the fly are generally in tact and, upon deformation of the assembly 8 into the conically-shaped configurations of FIGS. 5-7, the fly falls downwardly with the velocity shown in FIG. 9 as being V'. Thus, the fly can be caught by food by the assembly 8, trapped in the assembly 8 by release of the manual pressure, and the fly can then be exterminated by the pinching pressure. The assembly 8 can then by carried or conveyed to another location, such as a waste basket, or an outdoor enviroment, where the manual pressure again forms the assembly 8 into a conical configuration and held vertically so that the remains of the fly F drop downwardly.

While a trapezoidal shape is shown in the present invention, any generally trapezoidal shape even one approaching that of a rectangular or square shape, can be used if so desired. However, the trapezoidal shape shown in the preferred embodiments of the present invention have the advantage of being economical in the use of material, and of providing a large opening at the bottom for receiving a fly, and a relatively small opening at the top to hinder the escape of the fly through the top. The use of transparent material in the present invention also facilitates the fly trapping function, since this generally prevents the fly from visually detecting the presence of the assembly 8 until the assembly 8 has been properly positioned and is moving downwardly. The open top of the conically-shaped configuration of the assembly 8 is generally desirable to permit the escape of air as shown in the figures, so that the fly will fly upwardly into the assembly 8 rather than to avoid it all together. This principle is very important to the efficiency of the present invention, since it is well-known that flies sense regions of high pressure and avoid them in escaping from a moving object including, for example, a closed receptacle having only a single open side.

The improved fly catcher of the present invention is capable of achieving the above-enumerated objects, and while preferred embodiments of the present invention have been disclosed, it will be understood that it is not limited thereto but may be otherwise embodied within the scope of the following claims.

What is claimed is:

1. A method for trapping insects, comprising the steps of:
   forming a pair of trapezoidal sheets which are substantially identical;
   joining closed side edges of said sheets as they lie in overlying relationship to one another;
   manually deforming said opposed edges toward one another to create an opening between said opposed sheets;
   positioning said opposed sheets above an insect to be trapped;
   release of manual pressure when the insect has entered a region between said opposed sheets;
   said opposed sheets returning to their original undeformed condition trapping the insect.

2. A method as claimed in claim 1, wherein each of said sheets is resiliently deformable.

3. The method as claimed in claim 1, wherein each of said opposed sheets is composed of transparent material; whereby the insect is unable to detect the presence of the material in time to escape.

4. The method as claimed in claim 1, wherein in said deformed condition said opposed sheets enclose a generally conically-shaped region.

5. A method of exterminating flying insects, comprising:
   providing a pair of trapezoidally-shaped resiliently deformable sheets;
   placing said sheets in overlying relationship and joining two opposed side edges thereof;
   manually forcing said two joined edges toward each other to cause a central region of each of said sheets to move away from each other, thereby causing said overlying sheets to enclose a region of space therebetween;
   positioning said overlying sheets over a flying insect to be trapped;
   permitting the flying insect to fly upwardly into an open bottom of the region formed between said overlying sheets;
   releasing the opposed side edges so that the sheets return to their original undeformed condition, thus trapping the flying insect between the two overlying sheets;
   applying a force to the trapped insect sufficient to exterminate it.

6. The method of claim 5, wherein the remains of the fly are released by applying a force to force the opposed side edges of said overlying sheets toward one another to again resiliently deform central regions of the opposed sheets away from one another, thereby releasing the flying insect to fall out of a region defined by the deformed opposed said overlying sheets.

* * * * *